(12) United States Patent
Goberti et al.

(10) Patent No.: US 9,290,648 B2
(45) Date of Patent: *Mar. 22, 2016

(54) SOFT POLYOLEFIN COMPOSITIONS AND HIGHLY FILLED COMPOUNDS THEREOF

(75) Inventors: Paolo Goberti, Ferrara (IT); Giampaolo Pellegatti, Ferrara (IT); Luca Lunghi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 13 days.

This patent is subject to a terminal disclaimer.

(21) Appl. No.: 14/116,183

(22) PCT Filed: May 9, 2012

(86) PCT No.: PCT/EP2012/058476
§ 371 (c)(1),
(2), (4) Date: Nov. 7, 2013

(87) PCT Pub. No.: WO2012/152802
PCT Pub. Date: Nov. 15, 2012

(65) Prior Publication Data
US 2014/0087186 A1    Mar. 27, 2014

Related U.S. Application Data

(60) Provisional application No. 61/484,909, filed on May 11, 2011.

(30) Foreign Application Priority Data

May 11, 2011    (EP) .................................... 11165601

(51) Int. Cl.
*C08L 23/14*    (2006.01)
*C08L 23/10*    (2006.01)
*C08L 23/16*    (2006.01)
*C08K 3/00*    (2006.01)

(52) U.S. Cl.
CPC . *C08L 23/14* (2013.01); *C08K 3/00* (2013.01); *C08L 23/10* (2013.01); *C08L 23/16* (2013.01); *Y10T 428/2933* (2015.01)

(58) Field of Classification Search
CPC ......... C08L 23/10; C08L 23/16; C08L 23/14; C08K 3/00; Y10T 428/2933
USPC .......... 428/375; 524/408, 423, 427, 431, 432, 524/433, 436, 428, 528; 525/240

IPC ...... C08L 23/10,23/16, 23/14; Y01T 428/2933; C08K 3/00
See application file for complete search history.

(56) References Cited

U.S. PATENT DOCUMENTS

| 6,673,855 | B1 | 1/2004 | Braga et al. | |
|---|---|---|---|---|
| 7,125,924 | B2 * | 10/2006 | Credali et al. | 524/425 |
| 2005/0165171 | A1 * | 7/2005 | Pelliconi et al. | 525/240 |
| 2008/0114113 | A1 | 5/2008 | Kokel et al. | |

FOREIGN PATENT DOCUMENTS

| CN | 1341141 A | 3/2002 |
|---|---|---|
| CN | 101084115 A | 12/2007 |
| EP | 0472946 A2 | 3/1992 |
| EP | 1043733 A1 | 10/2000 |
| WO | WO03/011962 A1 | 2/2003 |
| WO | WO2004/026957 A1 | 4/2004 |
| WO | WO2006/066998 A1 | 6/2006 |
| WO | WO 2010146074 A1 * | 12/2010 |

OTHER PUBLICATIONS

PCT International Search Report & Written Opinion mailed Jun. 14, 2012, for PCT/EP2012/058476.

* cited by examiner

*Primary Examiner* — Susannah Chung
*Assistant Examiner* — Josephine Chang

(57) ABSTRACT

Flexible polyolefin compositions with improved balance of properties particularly for applications where softness and ductility at low temperature is requested comprising:
  A) from 20 to 40% by weight of a crystalline polymer fraction consisting of a propylene homopolymer, or a copolymer of propylene, or mixtures thereof, said crystalline fraction having a xylene insoluble fraction at 25° C. of at least 90% by weight.
  B) from 60 to 80% by weight of an elastomeric fraction consisting of a copolymer or blend of copolymers of propylene with one or more alpha-olefins, and optionally with minor quantities of a diene; said copolymer or blend containing ethylene in a quantity lower than 40% by weight.

the fraction soluble in xylene at 25° C. of said polyolefin composition having IVgpc lower than 2.5 dl/g, Mw/Mn (GPC) equal to or higher than 4, Mz/Mw (GPC) equal to or higher than 2.5

Said polyolefin composition optionally further comprising an inorganic filler (II) selected from flame-retardant inorganic fillers and inorganic oxides or salts.

3 Claims, No Drawings

SOFT POLYOLEFIN COMPOSITIONS AND HIGHLY FILLED COMPOUNDS THEREOF

This application is the U.S. National Phase of PCT International Application PCT/EP2012/058476, filed May 9, 2012, claiming priority of European Patent Application No. 11165601.3, filed May 11, 2011, and the benefit under 35 U.S.C. 119(e) of U.S. Provisional Application No. 61/484,909 filed May 11, 2011, the contents of which are incorporated herein by reference in their entirety.

FIELD OF THE INVENTION

The present invention concerns soft polyolefin compositions and soft compounds thereof comprising a high amount of inorganic fillers.

BACKGROUND OF THE INVENTION

Polyolefin compositions having elastic properties while maintaining a good thermoplastic behavior have been used in many application fields, due to the valued properties which are typical of polyolefins, such as chemical inertia, mechanical properties and nontoxicity. Moreover, they can be advantageously transformed into finished products with the same techniques used for thermoplastic polymers. In particular, flexible polymer materials are widely used in the medical field, as well as for packaging, extrusion coating and electrical wires and cables covering. In many of these applications, vinyl chloride polymers containing adequate plasticizers, which are necessary to give said polymers their desired flexibility characteristics, are presently used. Said polymer products, however, are subject to ever increasing criticism both for the suspected toxicity of the plasticizers they contain and because when incinerated, they can disperse into the atmosphere extremely toxic by-products, such as dioxin. It would be very useful, therefore, to substitute said materials with products which besides the desired flexibility characteristics and transparency, would have the chemical inertia and nontoxicity typical of olefin polymers. Elastic polypropylene compositions retaining good thermoplastic behavior have been obtained in the art by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride are commonly used for this purpose. For instance, EP-A-472 946 describes flexible elastoplastic polyolefin compositions comprising, in parts by weight: A) 10-50 parts of an isotactic propylene homopolymer or copolymer; B) 5-20 parts of an ethylene copolymer, insoluble in xylene at room temperature; and C) 40-80 parts of an ethylene/propylene copolymer containing less than 40% by weight of ethylene and being soluble in xylene at room temperature; the intrinsic viscosity of said copolymer is preferably from 1.7 to 3 dl/g. Said compositions are relatively flexible and have good elastic properties, as demonstrated by flexural modulus lower than 150 MPa values, Shore D hardness from 20 to 35, and Shore A hardness of about 90, associated with good tension set values (of 20-50% at 75% elongation, and about 33-40% at 100% elongation); nevertheless, such values are not fully satisfactory for many applications. Mineral fillers, such as aluminum and magnesium hydroxides or calcium carbonate, are commonly used at high concentration levels in polyolefin compositions for several reasons, for instance to impart self-extinguishing properties or to improve application-related physical properties, such as soft touch and printability. The major disadvantage of these mineral fillers, in particular when used on functional grounds as in the case of flame retardants, is the very high loading needed. Depending on the class of fire-retardancy requested, up to 65-70% by weight of filler can be necessary in order to reach adequate effectiveness in polyolefins: A lower amount of filler around 40-60% wt can be also sufficient for flame retardancy in certain applications. Normally, this has a highly negative influence on the processing of the polymer, with difficulties in adding and dispersing such high levels of filler, and on the physical-mechanical properties of compounds, namely lower elongation at break, lower tensile strength and higher brittleness. EP 1 043 733 describes self-extinguishing electrical cables having a coating layer based on a polymer material containing a flame-retardant inorganic filler; this polymer material comprises a heterophase copolymer having at least 45% by weight of an elastomeric phase based on ethylene copolymerized with an alpha-olefin, and a thermoplastic phase based on propylene. While these compositions incorporate large amounts of flame-retardant filler, the very high levels of filler negatively affect the physical-mechanical properties of the polymer material, and in particular lead to low elongation values. As a result, the final product is no longer apt to various applications, such as roofing, membranes and cables. In order to compete with plasticised PVC in the above applications, it would be necessary to provide flexible polyolefin compositions, having low flexural modulus and hardness values, capable of incorporating large amounts of filler without deterioration of physical and mechanical properties, and in particular elongation at break, stress at break, tension set and improved behaviour at low temperature.

More flexible elastoplastic polyolefin compositions have been described in the International Application WO03/011962, and comprise, by weight:

A) 8 to 25% of a crystalline polymer fraction selected from propylene homopolymer and propylene copolymers with a C4-8 alpha-olefin;

B) 75 to 92% of an elastomeric fraction comprising two different propylene elastomeric copolymers, and more specifically: (1) a first elastomeric copolymer of propylene with 15 to 32% of ethylene and or a C4-8 alpha-olefin, and (2) a second elastomeric copolymer of propylene with more than 32% up to 45% of ethylene and/or a C4-8 alpha-olefin, the (1)/(2) weight ratio ranging from 1:5 to 5:1. These polyolefin compositions have flexural modulus lower than 60 MPa, Shore A lower than 90, and tension set at 100% elongation lower than 35%. The compositions described in this document do not contain relevant amounts of fillers.

In the International Application WO2004/026957 the flexible polyolefin compositions described in WO03/011962 are filled with 40 to 80% by weight of an inorganic filler, selected from flame-retardant inorganic fillers and inorganic oxides or salts, without loosing their physical-mechanical properties, and in particular retaining low hardness and flexural modulus values, high elongation at break and low tension set values. and The highly filled soft polyolefin compositions described in WO2004/026957 have preferably Shore A hardness lower than 90, elongation at break (ASTM D638) higher than 400%, tensile strength at break (ASTM D638) equal to or higher than 4 MPa.

SUMMARY OF THE INVENTION

It is still felt the need of polyolefin compositions that, when appropriately compounded with inorganic fillers, show improved balance of properties particularly in applications where softness and ductility at low temperature is requested without excessive deterioration of other mechanical properties such as particularly tensile properties.

Thus, it is an object of the present invention a flexible heterophasic polyolefin composition (I), comprising the following fractions (wherein the total of A and B fractions is 100%):

A) from 20 to 40%, preferably from 25 to 35% by weight of a crystalline polymer fraction consisting of a propylene homopolymer, or a copolymer of propylene with one or more comonomers selected from ethylene and a $CH_2$=CHR alpha-olefin, where R is a $C_2$-$C_8$ alkyl radical, or mixtures thereof; said homopolymer or copolymer containing at least 85% by weight of units derived from propylene, said crystalline fraction having a fraction insoluble in xylene at 25° C. of at least 90% by weight, preferably having intrinsic viscosity of the xylene insoluble fraction of from 1.2 to 1.8 dl/g and preferably MFR (230° C./2.16 Kg) of from 2 to 70, more preferably of from 20 to 50 g/10 min.

B) from 60 to 80%, preferably from 65 to 75% by weight of an elastomeric fraction consisting of a copolymer or blend of copolymers of ethylene with one or more comonomers selected from propylene and $CH_2$=CHR alpha-olefins, where R is a C2-C8 alkyl radical, and optionally with minor quantities of a diene; said copolymers containing units derived from ethylene (i.e polymer chain segments) in a quantity lower than 40% by weight, said elastomeric fraction preferably having solubility in xylene at room temperature (25° C.) greater than 50% by weight, and preferably intrinsic viscosity of the soluble fraction η of equal to or less than 2.3 dl/g.

the fraction soluble in xylene at 25° C. of said polyolefin composition having IVgpc lower than 2.5 dl/g, preferably of from 1.7 to 2.2 dl/g; and a broad molecular weight distribution Mw/Mn (GPC) equal to or higher than 4, preferably of from 4.2 to 6, Mz/Mw (GPC) equal to or higher than 2.5.

The above said polyolefin composition preferably have MFR 230° C./2.16 Kg of from 3 to 8 gr/10 min.

A further object of the present invention is a filled polyolefin composition preferably having MFR 230° C./2.16 Kg of from 0.5 to 2 gr/10 min comprising:

a) 20 to 60% by weight of the polyolefin composition (I) according to the previous description, and b) 40 to 80% by weight of an inorganic filler (II) selected from flame-retardant inorganic fillers and inorganic oxides or salts, wherein the total of a and b is 100%.

The above said broad molecular weight distribution of the fraction soluble in xylene at room temperature of the elastomeric component B is preferably obtained by blending two or more flexible heterophasic polyolefin compositions having different xylene soluble intrinsic viscosities (XSIV=η), optionally and preferably obtainable by different degree of visbreaking. Particularly preferred is the blend of three heterophasic compositions as hereinbelow described in detail.

The highly filled polyolefin compositions of the invention have preferably Shore Hardness D lower than 50, elongation at break (ISO 527-3, technically equivalent to the ASTM D638 norm) higher than 250% and tensile strength at break (ISO 527-3) equal to or higher than 10, preferably higher than 15 MPa and Tg-DSC lower than −40° C.

The filled composition of the present invention are particularly suitable in application for roofing and geo-membrane where softness and ductility of the material is essential. Particularly advantageously they will find use in sites with rigid climate or broad seasonal or daily variations of temperature.

DETAILED DESCRIPTION OF THE INVENTION

The heterophasic polyolefin composition of the invention are able to incorporate and retain high amount of inorganic filler, maintaining very low flexural modulus values and flexible behavior and, at the same time exerting the property imparted by the filler, such as self-extinguishing properties in case of flame-retardant fillers, which is essential for most cable applications, roofing applications and soft sheeting. Moreover, the compositions of the invention, at comparable values of tensile strength, show elongation at break values equal to or higher than the ones shown by the filled compositions known in the prior art. Finally, the compositions of the invention are endowed with good low temperature behaviour in terms of lower glass transition temperature (DSC-Tg) and improved ductility at puncture impact behaviour test.

The polyolefin composition (I) according to the invention is an heterophasic composition comprising the following fractions:

A) from 20 to 40, preferably 25 to 35% by weight of a crystalline polymer fraction consisting of a propylene homopolymer, or a copolymer of propylene with one or more comonomers selected from ethylene and a $CH_2$=CHR alpha-olefin, where R is a $C_2$-$C_8$ alkyl radical, or mixtures thereof; said homo or copolymer containing at least 85% by weight of units derived from propylene, said crystalline fraction having a fraction insoluble in xylene at 25° C. of at least 90% by weight, preferably having intrinsic viscosity of the xylene insoluble fraction (XinsIV) of from 1.2 to 1.8 dl/g and preferably MFR (230° C./2.16 Kg) of from 2 to 70, more preferably of from 20 to 50 g/10 min;

B) from 60 to 80%, preferably from 65 to 75% by weight of an elastomeric fraction consisting of a copolymer or blend of copolymers of ethylene with one or more comonomers selected from propylene and $CH_2$=CHR alpha-olefins, where R is a $C_2$-$C_8$ alkyl radical, and optionally with minor quantities of a diene; said copolymer or blend containing units derived from ethylene in a quantity equal to or less than 40% by weight;

wherein the total of A and B fractions is 100%, the fraction soluble in xylene at 25° C. of said polyolefin composition having IVgpc the Intrinsic Viscosity of the fraction soluble in xylene at 25° C., measured by gel permeation chromatography (GPC), equal to or less than 2.5 dl/g, preferably of from 1.7 to 2.2 dl/g; the ratio Mw/Mn of weight average molecular weight (Mw) to number average molecular weight (Mn) measured by gel permeation chromatography (GPC) equal to or more than 4, preferably of from 4.2 to 6, the ratio Mz/Mw of Z-average molecular weight (Mz) to weight average molecular weight (Mw) measured by gel permeation chromatography (GPC) equal to or more than 2.5.

By "elastomeric" is meant herein a polymer having low crystallinity or amorphous, preferably having solubility in xylene at 25° C. greater than 50%, preferably greater than 60% by weight. More preferably, and alternatively to the IVgpc value, the intrinsic viscosity η of the Xylene soluble fraction at 25° C. of the compositions according to the invention can be measured and is equal to or less than 2.3 dl/g, preferably equal to or less than 2.1, even more preferably of from 1.5 to 2.1 dl/g.

According to a preferred embodiment of the composition (I) according to the present invention, the elastomeric fraction (B) comprises two or more, preferably three components B1, B2 and B3. The intrinsic viscosity η of the fraction soluble in xylene at 25° C. of B1, B2 and B3, measured as described in the experimental part, being respectively:

($\eta_{B1}$) equal to or greater than 3, preferably from 3 to 10 dl/g;

($\eta_{B2}$) from 2 to 3 dl/g;

($\eta_{B3}$) equal to or less than 2, preferably from 1.5 to 2 dl/g,

Further preferably the intrinsic viscosities (IVgpc) of the fraction soluble in xylene at 25° C. of B1, B2 and B3 measured via GPC, as described in the experimental part, are respectively:

IVgpc of B1 is equal to or greater than 2.5 dl/g,

IVgpc of B2 is of from 1.5 to 2.5 dl/g and

IVgpc of B3 is equal to or less than 1.5 dl/g

The composition (I) according to the invention preferably have MFR 230° C./2.16 Kg of from 3 to 8 gr/10 min.

In the polyolefin composition (I), said alpha-olefin of formula $H_2C=CHR$ is preferably selected from, butene-1, pentene-1,4-methylpentene, hexene-1, octene-1 and combinations thereof.

The copolymerization of propylene and ethylene or another alpha-olefin or combinations thereof, to form the elastomeric fraction (B), or the preferred copolymer components B1, B2 and B3 can occur in the presence of a diene, conjugated or not, such as butadiene, 1,4-hexadiene, 1,5-hexadiene and ethylidene-norbornene-1. The diene, when present, is contained in an amount of from 0.5 to 5% by weight, with respect to the weight of the fraction (B).

According to a preferred embodiment of the invention, the heterophasic polyolefin composition (I) is in the form of spheroidal particles having an average diameter of 250 to 7,000 microns, a flowability of less than 30 seconds and a bulk density (compacted) greater than 0.4 g/ml. The heterophasic polyolefin composition (I) may be prepared by polymerization in sequential polymerization stages, with each subsequent polymerization being conducted in the presence of the polymeric material formed in the immediately preceding polymerization reaction. The polymerization stages may be carried out in the presence of a Ziegler-Natta and/or a metallocene catalyst. According to a preferred embodiment, all the polymerization stages are carried out in the presence of a catalyst comprising a trialkylaluminum compound, optionally an electron donor, and a solid catalyst component comprising a halide or halogen-alcoholate of Ti and an electron donor compound supported on anhydrous magnesium chloride, said solid catalyst component having a surface area (measured by BET) of less than 200 m2/g, and a porosity (measured by BET) higher than 0.2 ml/g. Catalysts having the above mentioned characteristics are well known in the patent literature; particularly advantageous are the catalysts described in U.S. Pat. No. 4,399,054 and EP-A-45 977. Other examples can be found in U.S. Pat. No. 4,472,524. The polymerization process is described in details in the International Application EP-A-472946, the content of which is incorporated herein by reference. The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

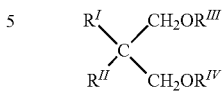

wherein RI and RII, the same or different from each other, are $C_1$-$C_{18}$ alkyl, $C_3$-$C_{18}$ cycloalkyl or Cr $C_{1-8}$ aryl radicals; RIII and RIV, the same or different from each other, are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in EP-A-361 493 and EP-A-728 769. Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene. The preparation of the above mentioned catalyst components is carried out according to known methods. For example, a $MgCl_2$.nROH adduct (in particular in the form of spheroidal particles) wherein n generally ranges from 1 to 3 and ROH is ethanol, butanol or isobutanol, is reacted with an excess of $TiCl_4$ containing the electron-donor compound. The reaction temperature is generally comprised between 80 and 120° C. The solid is then isolated and reacted once more with $TiCl_4$, in the presence or absence of the electron-donor compound; it is then separated and washed with a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds which can be used in the preparation of the solid catalyst component are the halides and the halogen alcoholates of titanium. Titanium tetrachloride is the preferred compound. The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio is from 1 to 1000. Electron-donor compounds that can be used as external donors include aromatic acid esters such as alkyl benzoates, and in particular silicon compounds containing at least one Si—OR bond, where R is a hydrocarbon radical. Examples of silicon compounds are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. 1,3-diethers having the formulae described above can also be used advantageously. If the internal donor is one of these dieters, the external donors can be omitted. The solid catalyst component have preferably a surface area (measured by BET) of less than 200 m$^2$/g, and more preferably ranging from 80 to 170 m$^2$/g, and a porosity (measured by BET) preferably greater than 0.2 ml/g, and more preferably from 0.25 to 0.5 ml/g.

The catalysts may be precontacted with small quantities of olefin (prepolymerization), maintaining the catalyst in suspension in a hydrocarbon solvent, and polymerizing at temperatures from room temperature to 60° C., thus producing a quantity of polymer from 0.5 to 3 times the weight of the catalyst. The operation can also take place in liquid monomer, producing, in this case, a quantity of polymer 1000 times the weight of the catalyst. By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerization stages may occur in liquid phase, in gas phase or liquid-gas phase. Preferably, the polymerization of the crystalline polymer fraction (A) is carried out in liquid monomer (e.g. using liquid propylene as diluent), while the copolymerization stages of the elastomeric copolymer(s) in fraction (B) are carried out in gas phase, without intermediate stages except for the partial degassing of the propylene. According to a most preferred embodiment, all the sequential polymerization stages are carried out in gas phase.

The reaction temperature in the polymerization stage for the preparation of the crystalline polymer fraction (A) and in the preparation of the elastomeric copolymer(s) in fraction (B) can be the same or different, and is preferably from 40° C. to 90° C.; more preferably, the reaction temperature ranges from 50 to 80° C. in the preparation of the fraction (A), and from 40 to 80° C. for the preparation of components (B). The pressure of the polymerization stage to prepare the fraction (A), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerization pressure preferably ranges from 33 to 43 bar, if done in liquid phase, and from 5 to 30 bar if done in gas phase. The residence times relative to the two stages depend on the desired ratio between the fractions (A) and (B), and can usually range from 15 minutes to 8 hours. Conventional molecular weight regulators known in the art, such as chain transfer agents (e.g. hydrogen or ZnEt2), may be used.

The preferred composition according to the present invention having component A and an elastomeric fraction made of components B1 B2 and B3 can be obtained with the above described process in four stages; one stage for the production of component (A) and three for the production of three elastomeric components B1 B2 and B3 having the required values of intrinsic viscosities.

Alternatively the composition according to the invention can be obtained by separate production of the components and subsequent blending e.g. melt blending in conventional extrusion or mixing equipments. Sequential polymerization and melt blending steps can be also used in mixed sequential and melt blending processes for the production of the composition according to the invention.

Alternatively and even more preferably, an heterophasic composition according to the invention can be obtained producing an heterophasic composition HPO1, obtainable as a reactor blend by sequential polymerization as described in EP-A-472946, comprising:
A) from 20 to 40, preferably from 25 to 35% by weight of a crystalline polymer fraction consisting of a propylene homopolymer, or a copolymer of propylene with one or more comonomers selected from ethylene and a $CH_2=CHR$ alpha-olefin, where R is a $C_2$-$C_8$ alkyl radical, or mixtures thereof; said (co)polymers containing at least 85% by weight of units derived from propylene, said crystalline fraction having a fraction insoluble in xylene at 25° C. of at least 90% by weight, preferably having intrinsic viscosity of the xylene insoluble fraction (XinsIV) of from 1.2 to 1.8 dl/g and preferably MFR (230° C./2.16 Kg) of from 2 to 70, more preferably of from 20 to 50 g/10 min, even more preferably greater than 25 g/10 min.
B) from 60 to 80%, preferably from 65 to 75% by weight of an elastomeric fraction consisting of a copolymer of ethylene with one or more comonomers selected from propylene and $CH_2=CHR$ alpha-olefins, where R is a $C_2$-$C_8$ alkyl radical, and optionally with minor quantities of a diene, or mixtures thereof; said copolymer containing units derived from ethylene in a quantity equal to or less than 40% by weight;

The said composition HPO1 having MFR1 (290° C./2.16 Kg) of equal to or less than 5, preferably of less than 1 gr/10 min and Xylene Soluble Intrinsic Viscosity (XSIV $\eta_1$) of equal to or greater than 3. Suitable as composition HPO1 is an heterophasic polyolefin composition commercialized by Basell under the commercial name Hifax CA10A.

The above said composition HPO1 can be subsequently visbroken via peroxide treatment producing further heterophasic compositions:
HPO2 having MFR2 values of from 5 to 10 g/10 min and XSIV $\eta_2$ of from 2 to 3 dl/g, and HPO3 having MFR3 values equal to or higher than 10 g/10 min and XSIV $\eta_3$ of equal to or less than 2 dl/g. The said compositions HPO1, HPO2 and HPO3 are blended in proportion of
25-50% wt of HPO1, preferably 30-40% wt
25-50% wt of HPO2, preferably 30-40% wt and
25-50% wt of HPO3, preferably 30-40% wt
wherein the total of HPO1, HPO2 and HPO3 is 100%, providing the composition (I) according to the invention. It is assumed that $\eta_1, \eta_2, \eta_3$ are substantially corresponding to the values of $(\eta_{B1}), (\eta_{B2})$, and $(\eta_{B3})$ due to the very low xylene solubility of component A.

The further object of the present invention is a highly filled soft polyolefin composition comprising from 20 to 60% by weight, preferably from 30 to 50%, and even more preferably from 30 to 35% of the composition (I) as above described and from 40 to 80% by weight, preferably from 50 to 70%, and even more preferably from 65 to 70% of an inorganic filler (II) selected from flame-retardant inorganic fillers and inorganic oxides or salts; wherein the total of a and b is 100%.

In applications where self-extinguishing properties are required, preferred flame-retardant inorganic fillers are hydroxides, hydrated oxides, salts or hydrated salts of metals, in particular of Ca, Al or Mg, such as, for example: magnesium hydroxide $Mg(OH)_2$, aluminum hydroxide $Al(OH)_3$, alumina trihydrate $Al_2O_3.3H_2O$, magnesium carbonate hydrate, magnesium carbonate $MgCO3$, magnesium calcium carbonate hydrate, magnesium calcium carbonate, or mixtures thereof. $Mg(OH)_2$, $Al(OH)_3$, $Al_2O_3.3H_2O$ and mixtures thereof are particularly preferred. The metal hydroxides, in particular the magnesium and aluminium hydroxides, are preferably used in the form of particles with sizes which can range between 0.1 and 100 μm, preferably between 0.5 and 10 μm. One inorganic filler which is particularly preferred according to the present invention is a precipitated magnesium hydroxide, having specific surface area of from 1 to 20 $m^2/g$, preferably from 3 to 10 $m^2/g$, an average particle diameter ranging from 0.5 to 15 μm, preferably from 0.6 to 1 μm. and the Precipitated magnesium hydroxide generally contains very low amounts of impurities deriving from salts, oxides and/or hydroxides of other metals, such as Fe, Mn, Ca, Si, V, etc. The amount and nature of such impurities depend on the origin of the starting material. The degree of purity is generally between 90 and 99% by weight. The filler can be advantageously used in the form of coated particles. Coating materials preferably used are saturated or unsaturated fatty acids containing from 8 to 24 carbon atoms, and metal salts thereof, such as, oleic acid, palmitic acid, stearic acid, isostearic acid, lauric acid, and magnesium or zinc stearate or oleate. Inorganic oxides or salts are preferably selected from CaO, $TiO_2$, $Sb_2O_3$, ZnO, $Fe_2O_3$, $CaCO_3$, $BaSO_4$ and mixtures thereof.

The highly filled soft polyolefin compositions according to the present invention can be prepared by mixing the polymer component, the filler and optionally further additives according to methods known in the state of the art. For instance, the components may be mixed in an internal mixer having tangential rotors (such as Banbury mixers) or having interpenetrating rotors, or alternatively in continuous mixers (such as Buss mixers) or co-rotating or counter-rotating twin-screw mixers. The highly filled soft polyolefin compositions of the invention, having very low initial flexural modulus values, are capable of incorporating large amounts of fillers, at the same time retaining the physical and mechanical properties of unfilled and less flexible compositions. More specifically, the highly filled polyolefin compositions of the invention are preferably endowed with Shore D Hardness lower than 50 (ISO 868), more preferably lower than 48; elongation at break (ISO 527-3) higher than 250%, more preferably higher than 280%; even more preferably higher than 290%, tensile strength at break (ISO 527-3) equal to or higher than 10 MPa, more preferably higher than 15 MPa.

Moreover, the polyolefin compositions of the invention preferably have flexural modulus (ISO 178 on compression molded samples 1 mm thick) of lower than 600 MPa, more preferably from 300 to 600 MPa. A further characteristic of the highly filled polyolefin compositions of the instant invention is that they are capable of retaining ductile behavior at very low temperature having Tg-DSC values lower than −40° C. The polyolefin compositions of the present invention find application as plasticized PVC replacement. In fields where self-extinguishing properties are required, the compositions of the invention may be used in lieu of plasticized PVC, in applications such as reinforced and nonreinforced roofing membranes, inner filling for industrial cables, cable sheathing and adhesive tapes. Where flame-retardancy is not requested, the compositions of the invention may be advantageously used in non flame-retardant soft membranes, coupled or noncoupled with a reinforcement (e.g. in publicity banners, liners, tarpaulin, sport-wear and safety clothing), and as synthetic leather. Moreover, the compositions may be used in packaging and extrusion coating.

Therefore, the present invention is further directed to an article comprising the above described polyolefin composition. Specifically and preferably it is also directed to blown or cast film or sheets suitable for application in the field of roofing and geomembrane, requiring flexibility softness and ductility at low temperature.

Conventional additives commonly used in the state of the art may be added to the highly filled soft polyolefin compositions of the present invention. For instance, in order to enhance the compatibility between the inorganic filler and the heterophasic polymer composition, coupling agents may be used; said coupling agents may be saturated silane compounds or silane compounds containing at least one ethylenic unsaturation, epoxides containing an ethylenic unsaturation, organic titanates, mono- or dicarboxylic acids containing at least one ethylenic unsaturation, or derivatives thereof such as anhydrides or esters.

Mono- or dicarboxylic acids containing at least one ethylenic unsaturation, or derivatives thereof, which can be used as coupling agents are, for example, maleic acid, maleic anhydride, fumaric acid, citraconic acid, itaconic acid, acrylic acid, methacrylic acid and the like, and the anhydrides or esters derived therefrom, or mixtures thereof. Maleic anhydride is particularly preferred.

The coupling agents can be used as such or pre grafted onto a polyolefin, for example polyethylene or copolymers of ethylene with an alpha-olefin, by means of a radical reaction (as described for instance in EP-A-530 940. The amount of grafted coupling agent is generally comprised between 0.05 and 5 parts by weight, preferably from 0.1 to 2 parts by weight, relative to 100 parts by weight of polyolefin. Polyolefins grafted with maleic anhydride are commonly available as commercial products, such as Polybond 3200 produced by Chemtura or Qestron by Basell.

Alternatively, the coupling agents of carboxylic or epoxy type mentioned above (for example maleic anhydride) or silanes containing an ethylenic unsaturation (for example vinyltrimethoxysilane) can be added to the mixture in combination with a radical initiator so as to graft the compatibilizing agent directly onto the polymer material. Initiators which can be used are organic peroxides, such as tert-butyl perbenzoate, dicumyl peroxide, benzoyl peroxide, di-tert-butyl peroxide and the like. This technique is described, for example, in U.S. Pat. No. 4,317,765.

The amount of coupling agent to be added to the mixture may vary according to the nature of the coupling agent used and the amount of flame-retardant filler added, and preferably ranges from 0.01 to 10%, more preferably from 0.1 to 5%, and even more preferably from 1 to 3% by weight with respect to the total weight of the highly filled polyolefin composition. Depending on the properties needed for the different applications, the compositions of the invention may be used in further combination with other elastomeric polymers such as ethylene/propylene copolymers (EPR), ethylene/propylene/diene terpolymers (EPDM), copolymers of ethylene with $C_4$-$C_{12}$ alpha-olefins (e.g. ethylene/octene-1 copolymers, such as the ones commercialized under the name Engage®) and mixtures thereof. Such elastomeric polymers may be present in an amount of 5 to 80% wt. of the total composition. Particularly preferred, added in amount from 1-30% wt of the total composition, are elastomeric copolymers having flexural elastic modulus (MEF) equal to or less than 30 MPa and Shore A Hardness equal to or lower than 90, preferably lower than 70. Suitable elastomeric copolymers are metallocene butene-1 (co)polymer plastomers such as those described in EP-B-2158235 and soft heterophasic polypropylene polymers such as those described in WO03/011962. The effect of the addition of the said elastomeric materials is that the improvement of certain properties (e.g elongation) is obtained without deterioration of softness and ductilility at low temperature.

Conventional additives such as processing aids, lubricants, nucleating agents, extension oils, organic and inorganic pigments, anti-oxidants and UV-protectors, commonly used in olefin polymers, may also be added.

Processing aids usually added to the polymer material are, for example, calcium stearate, zinc stearate, stearic acid, paraffin wax, synthetic oil and silicone rubbers. Examples of suitable antioxidants are polymerized trimethyldihydroquinoline, 4,4'thiobis(3-methyl-6-tert-butyl)phenol; pentaerythrityltetrakis[3-(3,5-di-tert-butyl-4-hydroxyphenyl)propionate] and 2,2'-thiodiethylenebis[3-(3,5-di-tertbutyl-4-hydroxyphenyl) propionate]. Other fillers which can be used are, for example, glass particles, glass fibers, calcinated kaolin and talc.

The following analytical methods have been used to determine the properties reported in the present application.

Property Method

Melt Flow Rate

ISO1133, at 230° C., 2.16 kg where not differently specified

MWD and IV Determination Via GPC

The Mn, Mw and Mz and IVgpc values are measured by way of gel permeation chromatography (GPC) at 150° C. using a Alliance GPCV 2000 instrument (Waters) equipped with four mixed-bed columns PLgel Olexis Agilent having a particle size of 13 µm. The dimensions of the columns are 300×7.8 mm. The mobile phase used is vacuum distilled 1,2,4-Trichlorobenzene (TCB) and the flow rate is kept at 1.0 ml/min. The sample solution is prepared by heating the sample under stirring at 150° C. in TCB for about two hours. The concentration is 1 mg/ml. To prevent degradation, 0.1 g/l of 2,6-diterbutyl-p-cresol are added. 308.5 µL of solution are injected into the column set. A calibration curve is obtained using 10 polystyrene standard samples (EasyCal kit by Polymer Laboratories) with molecular weights in the range from 580 to 7500000. It is assumed that the K values of the Mark-Houwink relationship are:

$K=1.21\times10^{-4}$ dL/g and $\alpha=0.706$ for the polystyrene standards;

$K=2.46\times10^{-4}$ dL/g and $\alpha=0.725$ for the propylene copolymer samples.

A third order polynomial fit is used for interpolate the experimental data and obtain the calibration curve. Data acquisition and processing is done by using Empower 1.0 with GPCV option by Waters.

Low Temperature Impact Properties:

The impact properties were measured according to the ISO 6603 (Puncture Impact Behavior of Rigid Plastics) on samples obtained from 1 mm sheets extruded on a Brabender 30 mm, 25 L/D single screw extruder with 1 mm thick flat die, and cut in machine direction. The instrumental apparatus for the impact measurement was a CEAST-Fractovis INSTRON instrumented unit that allows to distinguish between ductile and brittle failure modes according to ISO 6603 without need for subjective judgments.

The modes of failure are:

Ductile (YD)

Ductile/Brittle (YS)

Brittle/Ductile (YU)

Brittle (NY)

The fracture mode was recorded for 10 samples per each composition tested.

Tensile Properties:

Tensile Strength at Break and Elongation at Break, were measured following the ISO 527-3 (item 5A, 500 mm/min), on samples obtained from 1 mm sheets extruded on a Brabender 30 mm, 25 L/D single screw extruder with 1 mm thick flat die, and cut and tested in machine direction.

Hardness Shore A (Sh.A) and Shore D (Sh.D)

measured on a compression moulded plaques (thickness of 4 mm) following the ISO 868.

Tg-DSC the glass transition temperature (Tg) was measured via DSC performed at 10° C./min. The Tg was determined after cooling starting from −90° C.

Tensile Elastic Modulus (MET-DMTA)

Tensile Elastic Modulus (storage modulus) determined at 23° C. via DMA analysis according to the ISO 6721-4 on 1 mm thick compression moulded plaque.

Flexural Elastic Modulus (MEF)

ISO 178 on 1 mm thick compression moulded plaque.

Comonomer Content (% wt)

IR. Spectroscopy

Intrinsic Viscosity

Determined in tetrahydronaphthalene at 135° C. for the insoluble fractions (XinsIV) and for the xylene soluble fractions (XSIV=η). XSIV=η of the compositions (I) according to the invention, are assumed to correspond substantially to the viscosity of the solubles of the elastomeric fraction component(s) B.

Xylene Soluble and Insoluble Fractions (% Wt)

determined as follows:

2.5 g of polymer composition and 250 cm³ of O-xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then cooled to 100° C. in air for 10 to 15 minute under stirring and then kept for 30 minutes in thermostatic water bath at 25° C. for 30 minutes as well. The so formed solid is filtered on quick filtering paper. 100 cm3 of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene (XS) at room temperature (25° C.) is then calculated.

Products Used in Working Examples

HPO1: Heterophasic polyolefin composition having MFR 0.8 g/10 min, MEF 80 MPa, Hardness Shore D (Sh.D) 30, $\eta_{B1}$ 3.3 dl/g, Mw/Mn 5.8, Mz/Mw 2.4, IVgpc 2.78 dl/g; and comprising 31% wt. of A1 a crystalline copolymer of propylene with 3.3% wt. of units derived from ethylene, having MFR A1 25 g/10 min, a soluble fraction in xylene at 25° C. of 6% wt, and XinsIV 1, 8 dl/g, and 69% wt. of B1 an elastomeric fraction of propylene with ethylene having 27% by weight of units derived from ethylene, 89% wt of fraction soluble in xylene at 25° C.

HPO2: Heterophasic polyolefin composition having MFR (230° C., 2.16 kg) of 8 g/10 min MEF 80 MPa, Shore D Hardness (Sh.D) 30; obtained by slight visbreaking HPO1 via peroxide treatment during pelletization, and further having after visbreaking $\eta_{B2}$ 2.8 dl/g, Mw/Mn 4.0, Mz/Mw 2.2, IVgpc 1.90 dl/g.

HPO3: Heterophasic polyolefin composition having MFR (230° C., 2.16 kg) of 14 g/10 min MEF 80 MPa, Shore D Hardness (Sh.D) 30, obtained by visbreaking HPO1 via peroxide treatment during pelletization, and having $\eta_{B3}$ 1.75 dl/g, Mw/Mn 3.40, Mz/Mw 2.1, IVgpc 1.48 dl/g.

Mg(OH)2: Kisuma 5A-C by Kyowa Chemical Industry, precipitated magnesium hydroxide coated with fatty acid for compatibilization with polyolefins having average particle size of 0.94 µm, purity 97.65%.

Processing Aid: Propylene homopolymer grafted with maleic anhydride (MA), with MFR (190° C., 2.16 Kg) of 115 g/10 min and MA content of 1% weight (Polybond 3200, sold by Chemtura).

Stabilizer: Irganox B215 commercialized by Ciba.

EXAMPLE 1

A polyolefin composition according to the present invention was obtained by blending in a Leistritz 27 mm twin screw extruder the heterophasic polyolefin compositions HPO1, HPO2 and HPO3 and the mineral filler and additives as reported in Table 1. The mechanical and thermal properties of this composition is reported in Table 1.

COMPARATIVE EXAMPLE 2

An highly filled polyolefin composition according to the invention was obtained by blending in a Leistritz 27 mm twin screw extruder the heterophasic polyolefin composition HPO2 and the mineral filler and additives as reported in Table 1. The mechanical and thermal properties of this composition is reported in Table 1.

COMPARATIVE EXAMPLE 3

Polyolefin composition similar to the one prepared in Example 2 was obtained, with the exception that the heterophasic polymer composition HPO1 was used. The mechanical and thermal properties of this compositions are reported in Table 1.

COMPARATIVE EXAMPLES 4-6

Polyolefin compositions were obtained, for comparative purposes, by blending a commercial crystalline propylene random copolymer with ethylene derived units in amount equal to 3% wt, insolubility in xylene at 25° C. of 96% wt and MFR (230° C., 2.16 Kg) of 8 g/10 min, with commercial elastomeric polymers produced by Dow Chemicals having the following properties:

Engage 8180 propylene ethylene copolymer with 38% ethylene, MFR (190° C./2.16 Kg) 0.5 g/10 min, MEF 8.5 MPa, Sh.A 63, Sh.D 16 and Narrow Molecular Weight Distribution (MWD=Mw/Mn) of 2 to 3

Versify 2300 propylene ethylene copolymer with 13.1% wt ethylene MFR (230° C., 2.16 Kg) of 2 g/10 min, MEF 42 MPa, Sh.A 88, Sh.D 32 and Narrow Molecular Weight Distribution (MWD=Mw/Mn) 2.8, Mz/Mw 1.9, IVgpc 1.44.

Versify 3401 a propylene ethylene octene copolymer with 24% wt of ethylene, 3-4% wt octene, MFR L 8 g/10 min, MEF 22 MPa, Sh.A 72, Sh.D 22 and Narrow Molecular Weight Distribution (MWD=Mw/Mn) 3, Mz/Mw 2, IVgpc 1.90.

The mechanical and elastic properties of these compositions are reported in Table 1.

All the highly filled compositions show similarly high stress at break (about 16 Mpa), Elongation at break is maintained sufficiently high, while surprisingly low Tg values are exhibited by the highly filled composition of the present invention in combination with substantially improved ductility at low temperature that is not showed by the comparative compositions.

TABLE 1

|  |  | COMP. EX. 2 | COMP. EX. 3 | EX. 1 | COMP. EX. 4 | COMP. EX. 5 | COMP. EX. 6 |
| --- | --- | --- | --- | --- | --- | --- | --- |
| COMPONENTS (% WT) |  |  |  |  |  |  |  |
| Raco MIL 8 C2 = 3% | % wt |  |  |  | 9.85 | 15 | 13 |
| HPO1 | % wt |  | 45.85 | 14 |  |  |  |
| HPO3 | % wt |  |  | 17.85 |  |  |  |
| HPO2 | % wt | 45.85 |  | 14 |  |  |  |
| ENR8180 | % wt |  |  |  |  | 9.425 |  |
| Versify2300 | % wt |  |  |  | 36 | 21.425 |  |
| Versify3401 | % wt |  |  |  |  |  | 32.85 |
| C-KISUMA 5A Mg(OH)$_2$ | % wt | 50 | 50 | 50 | 50 | 50 | 50 |
| IRGANOX B215 | % wt | 0.15 | 0.15 | 0.15 | 0.15 | 0.15 | 0.15 |
| polybond 3200 | % wt | 4 | 4 | 4 | 4 | 4 | 4 |
| Properties |  |  |  |  |  |  |  |
| MFR (MIL) 230° C./2.16 kg | gr/10' | 2.2 | 0.3 | 1.3 | 1 | 0.88 | 2.4 |
| IVgpc* | dl/g | 1.90 | 2.78 | 2.02 |  |  |  |
| Mw/Mn* |  | 4.0 | 5.8 | 4.5 |  |  |  |
| Mz/Mw* |  | 2.2 | 2.4 | 2.6 |  |  |  |
| Mw* |  | 262284 | 450171 | 293237 |  |  |  |
| Mz* |  | 579200 | 1073385 | 775710 |  |  |  |
| Mn* |  | 65019 | 77811 | 65020 |  |  |  |
| FAILURE TEST ISO 6603 |  |  |  |  |  |  |  |
| Temperature | ° C. | −40 | −40 | −40 | −40 | −40 | −40 |
| B (YU) | Num | 6 | 1 | 10 | 0 | 0 | 0 |
| C (NY) | Num | 4 | 9 | 0 | 10 | 10 | 10 |
| Temperature | ° C. | −30 | −30 | −30 | −30 | −30 | −30 |
| D (YS) | Num | 0 | 0 | 0 | 0 | 7 | 0 |
| B (YU) | Num | 10 | 10 | 10 | 1 | 3 | 8 |
| C (NY) | Num | 0 | 0 | 0 | 9 | 0 | 2 |
| Temperature | ° C. | −20 | −20 | −20 | −20 | −20 | −20 |
| D (YS) | Num | 2 | 10 | 10 | 0 | 10 | 10 |
| B (YU) | Num | 8 | 0 | 0 | 9 | 0 | 0 |
| C (NY) | Num | 0 | 0 | 0 | 1 | 0 | 0 |
| Tensile stress @ yield | MPa | 12.1 | 12 | 12.3 | 11.5 | 13.2 | 10.8 |
| Elongation @ yield | % | 16 | 13.2 | 16 | 20 | 14 | 15.1 |
| Tensile stress @ break | MPa | 15.3 | 18.7 | 16.9 | 23.3 | 20.4 | 15 |
| Elongation @ break | % | 240 | 315 | 295 | 440 | 405 | 280 |

TABLE 1-continued

|  |  | COMP. EX. 2 | COMP. EX. 3 | EX. 1 | COMP. EX. 4 | COMP. EX. 5 | COMP. EX. 6 |
|---|---|---|---|---|---|---|---|
| Shore D Hardness- |  | 44.2 | 46 | 46.4 | 54.1 | 50.6 | 46.2 |
| Tg-DSC Data | °C. | −42.8 |  | −41.3 | −32.5 | −32.6 | −38.5 |
| MET-DMTA (23° C.) | MPa | 612 |  | 636 | 600 | 557 | 443 |

*GPC data measured on the fraction Xylene Soluble at 25° C. of the polymer blend without additive and filler-Kisuma.

What is claimed is:

1. An article comprising a polyolefin composition comprising:
    a polyolefin composition (I), the polyolefin composition (I) comprises the following fractions:
    A) from 20 to 40% by weight of a crystalline polymer fraction selected from the group consisting of a propylene homopolymer, and a copolymer of propylene with one or more comonomers selected from ethylene and a $CH_2$=CHR alpha-olefin, where R is a $C_2$-$C_8$ alkyl radical, or mixtures thereof,
        wherein the homopolymer or copolymer contains at least 85% by weight of units derived from propylene,
        wherein the crystalline fraction has a fraction insoluble in xylene at 25° C. of at least 90% by weight;
    B) from 60 to 80% by weight of an elastomeric fraction comprising a copolymer of ethylene with one or more comonomers selected from propylene and a $CH_2$=CHR alpha-olefin, where R is a $C_2$-$C_8$ alkyl radical; said copolymer containing units derived from ethylene in a quantity equal to or less than 40% by weight;
    wherein the total weight of A and B fractions is 100%, and the fraction soluble in xylene at 25° C. of said polyolefin composition has IVgpc lower than 2.5 dl/g,
    the ratio Mw/Mn of weight average molecular weight (Mw) to number average molecular weight (Mn) measured by gel permeation chromatography (GPC) is equal to or more than 4,
    the ratio Mz/Mw of Z-average molecular weight (Mz) to weight average molecular weight (Mw) measured by gel permeation chromatography (GPC) is equal to or greater than 2.5, and
    wherein said polyolefin composition exhibits a flexural modulus of 300 to 600 MPa, and Tg-DSC lower than −40° C., wherein the article is an inner filling, wherein the inner filling is enclosed in an industrial cable or cable sheathing.

2. The article of claim 1, wherein the polyolefin composition comprises:
    20 to 60% by weight of the polyolefin composition (I), and
    40 to 80% by weight of an inorganic filler (II) selected from a flame retardant inorganic filler and an inorganic oxide or salt.

3. The article according to claim 1, wherein the elastomeric fraction comprises a diene at 0.5 to 5% by weight of the fraction (B).

* * * * *